US009610865B2

(12) United States Patent
Chang

(10) Patent No.: US 9,610,865 B2
(45) Date of Patent: Apr. 4, 2017

(54) RECLINING DEVICE FOR VEHICLE SEAT

(71) Applicant: HYUNDAI DYMOS INCORPORATED, Seosan-si, Chungcheongnam-do (KR)

(72) Inventor: Seung Hun Chang, Hwaseong-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 60 days.

(21) Appl. No.: 14/724,130

(22) Filed: May 28, 2015

(65) Prior Publication Data

US 2015/0258918 A1 Sep. 17, 2015

Related U.S. Application Data

(63) Continuation of application No. PCT/KR2013/010850, filed on Nov. 27, 2013.

(30) Foreign Application Priority Data

Nov. 28, 2012 (KR) .......................... 10-2012-0136431

(51) Int. Cl.
B60N 2/22 (2006.01)
B60N 2/20 (2006.01)
(Continued)

(52) U.S. Cl.
CPC ......... *B60N 2/2213* (2013.01); *B60N 2/0232* (2013.01); *B60N 2/20* (2013.01); *B60N 2/2252* (2013.01)

(58) Field of Classification Search
CPC .............................. B60N 2/2213; B60N 2/2258
(Continued)

(56) References Cited

U.S. PATENT DOCUMENTS 4,063,776 A * 12/1977 Wahlmann ........... B60N 2/2252
297/361.1
4,736,986 A * 4/1988 Kato .................... B60N 2/2352
297/362

(Continued)

FOREIGN PATENT DOCUMENTS

CN 201055140 Y 5/2008
JP 2000-102440 A 4/2000
(Continued)

OTHER PUBLICATIONS

International Search Report issued Feb. 12, 2014 in International Application No. PCT/KR2013/010850.

*Primary Examiner* — Timothy J Brindley
(74) *Attorney, Agent, or Firm* — Brinks Gilson & Lione

(57) ABSTRACT

A reclining device for a vehicle seat of the present disclosure includes a base plate provided with an assembling depression, a gear plate inserted into the assembling depression, a mobile flange transferring a torque to a seatback, and a power transmission module installed in a central portion of the gear plate to eccentrically rotate the mobile flange and to inhibit power transfer in an opposite direction. In particular, the reclining device further includes a stopper having a stop protrusion on the mobile flange and the stop protrusion is inserted into an arcuate stop hole formed on the base plate so as to efficiently realizes the stopper's function to limit the forward and backward rotation angle of the seatback to a predetermined range using fewer parts, thus reducing the weight and production cost of a reclining device.

5 Claims, 3 Drawing Sheets

(51) Int. Cl.
*B60N 2/225* (2006.01)
*B60N 2/02* (2006.01)

(58) Field of Classification Search
USPC .......................................................... 297/362
See application file for complete search history.

(56) References Cited

U.S. PATENT DOCUMENTS

| | | | |
|---|---|---|---|
| 6,305,748 B1* | 10/2001 | Ohba .................. | B60N 2/2252 |
| | | | 297/362 |
| 2007/0290540 A1* | 12/2007 | Voss ..................... | B60N 2/2252 |
| | | | 297/362 |
| 2009/0224588 A1* | 9/2009 | Matsumoto .......... | B60N 2/2254 |
| | | | 297/362 |
| 2010/0201174 A1* | 8/2010 | Ito ........................ | B60N 2/0232 |
| | | | 297/362 |
| 2012/0001471 A1* | 1/2012 | Wei ...................... | B60N 2/2252 |
| | | | 297/362 |
| 2013/0207432 A1* | 8/2013 | Hiemstra ............. | B60N 2/2252 |
| | | | 297/362 |
| 2013/0313879 A1* | 11/2013 | Bedro .................. | B60N 2/0232 |
| | | | 297/362 |
| 2014/0239694 A1* | 8/2014 | Jiang .................... | B60N 2/2254 |
| | | | 297/362 |
| 2015/0054324 A1* | 2/2015 | Chang .................. | B60N 2/2254 |
| | | | 297/362 |
| 2015/0246625 A1* | 9/2015 | Leconte ............... | B60N 2/2252 |
| | | | 297/361.1 |

FOREIGN PATENT DOCUMENTS

| | | |
|---|---|---|
| JP | 2003-000379 A | 1/2003 |
| KR | 10-2011-0111350 A | 10/2010 |
| KR | 10-2011-0028509 A | 3/2011 |
| KR | 10-2011-0087067 A | 8/2011 |
| KR | 10-2011-0101897 A | 9/2011 |

\* cited by examiner

RECLINING DEVICE FOR VEHICLE SEAT

CROSS-REFERENCE TO RELATED APPLICATIONS

This application is a continuation of International Application No. PCT/KR2013/010850, filed on Nov. 27, 2013, which claims the benefit of Korean Patent Application 10-2012-0136431, filed on Nov. 28, 2012. The disclosures of the above applications are incorporated herein by reference.

FIELD

The present disclosure relates to a reclining device for a vehicle seat and, more particularly, to a mechanism of the reclining device that rotates a seatback forward and backward relative to a seat cushion.

BACKGROUND

The statements in this section merely provide background information related to the present disclosure and may not constitute prior art.

A vehicle seat comprises: a seat cushion on which a passenger sits; and a seatback that is connected to a rear end of the seat cushion and extends upward, and supports the back of the passenger. Here, the seatback is configured such that it is possible to adjust the forward or backward rotated angle of the seatback relative to the seat cushion, thereby allowing a passenger to have a comfortable sitting posture and contributing to the convenience of the passenger. In the related art, to adjust the forward or backward rotated angle of the seatback relative to the seat cushion, a reclining device for a vehicle seat is used.

A motor-operated reclining device and a hand-operated reclining device are used as reclining devices in the related art, and in recent years, the motor-operated reclining device has become more commonly used. The motor-operated reclining device has a mechanism that can automatically rotate the seatback by driving the reclining device using power supplied from a motor.

The above-mentioned reclining device is configured to realize a reclining function using a plurality of gears.

The reclining device is configured to be operated within a maximum rotation range of the seatback, so it is required to provide the reclining device with a stopper function to stop a further rotation of the seatback when the seatback has been rotated forward or backward at a predetermined rotation angle. In the related art, to realize the stopper function, the reclining device requires additional parts, resulting in an increase in the number of parts and in the weight of the reclining device.

SUMMARY

The present disclosure is directed to a reclining device for a vehicle seat that can efficiently realize a stopper function to limit a forward and backward rotation angle of a seatback to a predetermined range using fewer parts than in the conventional art, thereby reducing the weight and production cost of a reclining device having a stopper function.

The present disclosure provides a reclining device for a vehicle seat, including:

a base plate mounted to a seat cushion and integrally provided with an assembling depression;

a gear plate inserted into and mounted to the assembling depression, and provided with external gear teeth;

a mobile flange connected to a seatback in such a way that the mobile flange transmits torque to the seatback, the mobile flange being provided with internal gear teeth, a number of which is greater than a number of the external gear teeth of the gear plate by one, and being eccentrically meshed with the external gear teeth of the gear plate;

a power transmission module installed in a central portion of the gear plate and eccentrically rotating the mobile flange relative to the gear plate using the torque transmitted from outside; and a stop means provided between the mobile flange and the base plate, wherein the stop means includes a stop protrusion formed in the mobile flange and protruding toward the base plate, and an arcuate-shape stop hole formed in the base plate, and wherein the stop protrusion is inserted into the arcuate-shape stop hole and is configured to move along the arcuate-shape stop hole defining a predetermined range in which an angle of the seatback relative to the seat cushion is adjusted.

The reclining device of the present disclosure can efficiently realize a stopper function to limit a forward and backward rotation angle of a seatback to a predetermined range using fewer parts than in the conventional art, thereby reducing the weight and production cost of a reclining device having a stopper function.

Further, when a conventional stopper is used in which the strength of the stopper or the strength of a back frame is low, the stopper may be bent and may generate noise, and the operational feel at the end of the operational range becomes worse. To avoid the generation of noise and user dissatisfaction, a limit switch may be added in a luxury vehicle. Unlike a reclining device having the conventional stopper, the present disclosure can provide a robust stopper of a reclining device without using such an additional part.

Further, in the present disclosure, the stopper is realized by an engagement of the stop protrusion within the arcuate-shape stop hole, so the present disclosure can reduce the length of the stopper, and can prevent deformation of the stopper or the generation of noise.

Further, to change the rotation angle of a back frame, the conventional stopper is problematic in that it is required to newly produce a stopper and a lower bracket due to a designing limitation of a frame of the conventional stopper. However, the present disclosure can efficiently realize the desired change of the operational range of the stopper by changing the design of a stop hole forming mold.

Further, unlike the conventional reclining device in which, to form a desired operational range of the stopper, the flange of the lower bracket is partially cut, resulting in a reduction in the structural strength of the flange, the present disclosure maintains the shape of the flange without partially cutting the flange, thereby providing a high structural strength to the flange.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
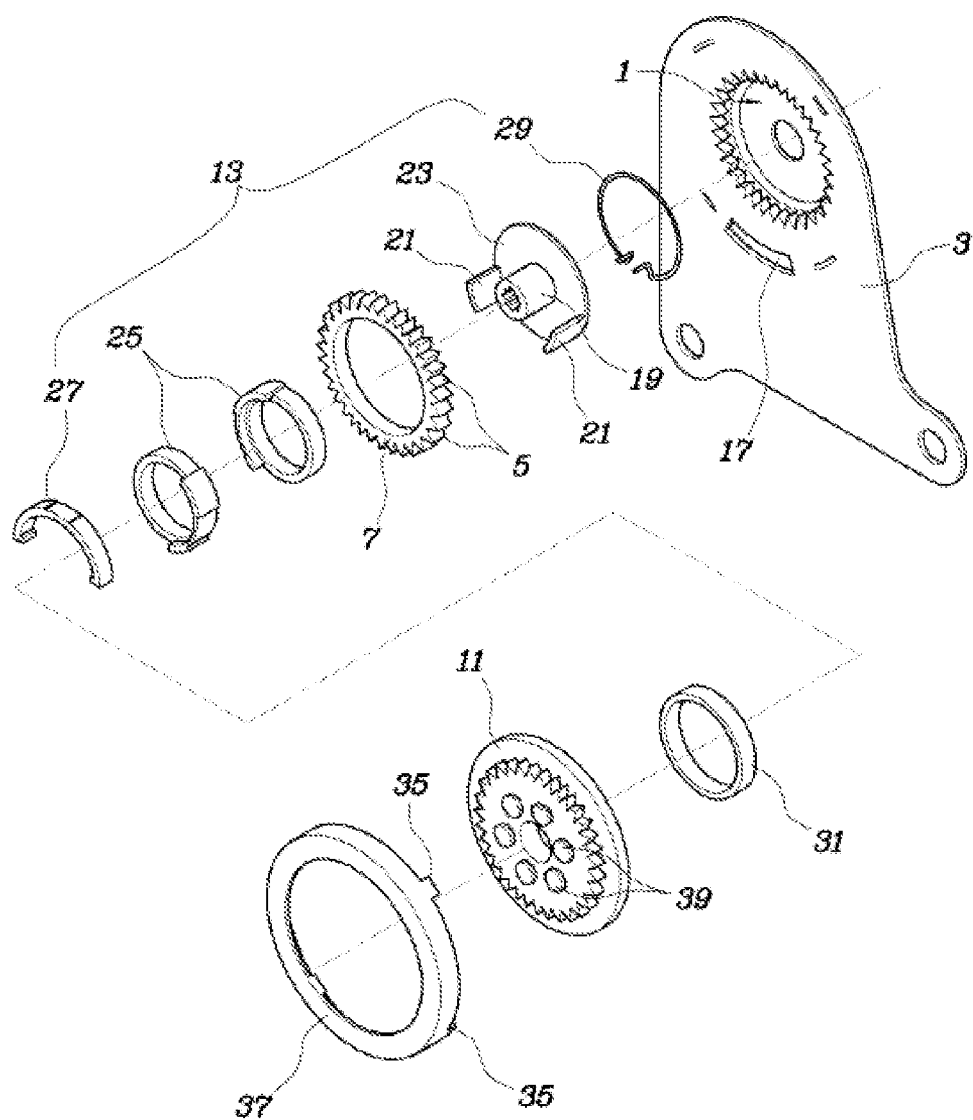
FIG. 1 is a view showing the configuration of a reclining device for a vehicle seat according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
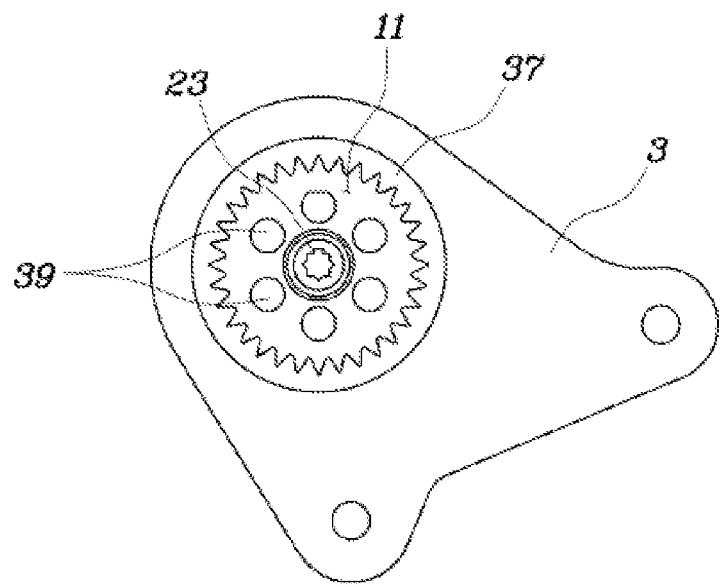
FIG. 2 is a view showing an assembled state of parts of FIG. 1.
Figure 3:
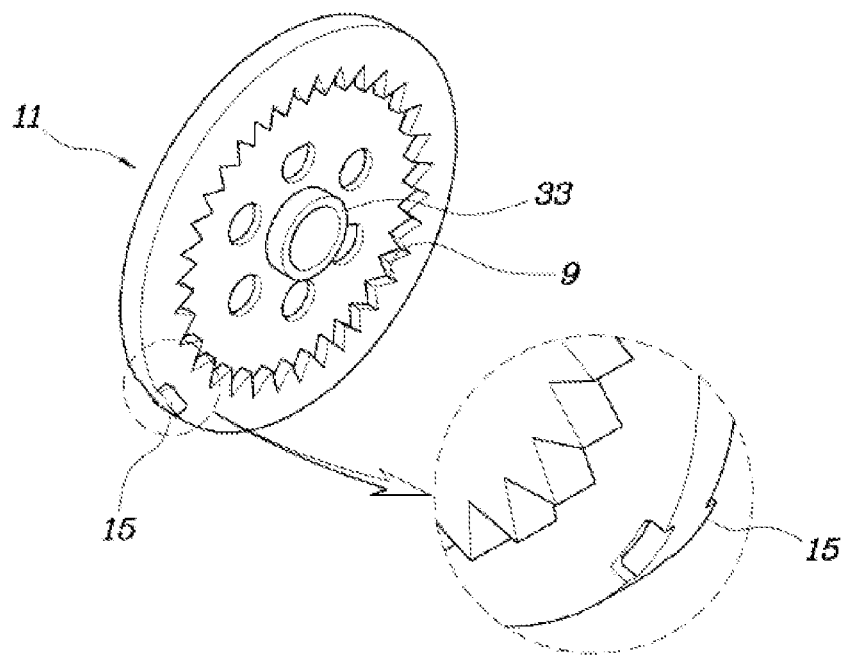
FIG. 3 is a view showing the configuration of a mobile flange of FIG. 1 in detail.
Figure 4:
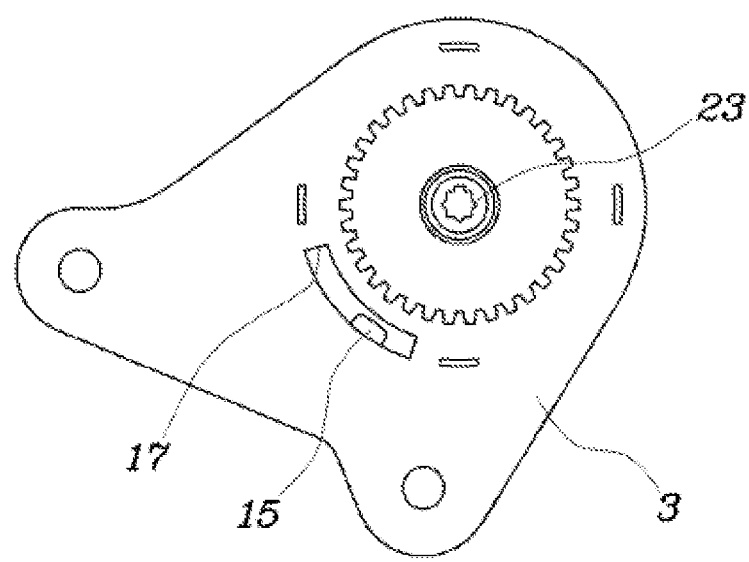
FIG. 4 is a view showing the assembled state of the parts of FIG. 2 when the assembled parts are viewed from an opposite direction.

As shown in FIGS. 1 to 4, a reclining device for a vehicle seat according to an embodiment of the present disclosure includes: a base plate 3 mounted to a seat cushion and integrally provided with an assembling depression 1; a gear plate 7 inserted into and mounted to the assembling depression 1, and provided with external gear teeth 5; a mobile flange 11 connected to a seatback in such a way that the mobile flange transmits torque to the seatback, the mobile flange being provided with internal gear teeth 9, a number of which is greater than a number of the external gear teeth 5 of the gear plate 7 by one, and being eccentrically meshed with the external gear teeth 5 of the gear plate 7; and a power transmission module 13 installed in a central portion of the gear plate 7 and eccentrically rotating the mobile flange 11 relative to the gear plate 7 using the torque transmitted from outside, and preventing power from being transmitted in an opposite direction, wherein a stop means functioning to limit a rotation range of the mobile flange 11 relative to the base plate 3 is provided between the mobile flange 11 and the base plate 3.

The stop means includes: a stop protrusion 15 provided on the mobile flange 11 by protruding toward the base plate 3; and an arcuate stop hole 17 provided in the base plate 3, into which the stop protrusion 15 is inserted so that the stop protrusion 15 is rotated within a predetermined range.

In other words, the base plate 3 may be mounted to a cushion frame or another part of the seat cushion, and the mobile flange 11 may be mounted to a back frame or another part of the seatback, so when torque is transmitted to the power transmission module 13, the mobile flange 11 eccentrically moves relative to the gear plate 7 and is rotated relative to the gear plate 7 due to a difference in the number of teeth between the gear plate 7 and the mobile flange 11. Accordingly, the seatback is rotated relative to the seat cushion, so the angle of the seatback relative to the seat cushion may be adjusted. Here, the angle of the seatback relative to the seat cushion is adjustable only when the stop protrusion 15 is movable within the stop hole 17. In other words, when the stop protrusion 15 is stopped by ends of the stop hole 17, further adjustment of the angle of the seatback is inhibited or prevented.

The power transmission module 13 includes: a drive wheel 23 provided with a drive hub 19 that passes through the center of the mobile flange 11 and is combined with a connection shaft transmitting the torque, with a drive protrusion 21 provided on the drive wheel in such a way that the drive protrusion is integrally connected to the drive hub 19; lock cams 25 placed outside the drive hub 19 and rotated by the drive protrusion 21; a pressure cam 27 supporting the lock cams 25 at a position outside the lock cams 25 so as to maintain eccentric positions of the lock cams 25 and the drive wheel 23 relative to the gear plate 7; and a wedge spring 29 placed to elastically support the lock cams 25.

A bushing 31 is fitted over the lock cams 25 and the pressure cam 27 so as to support the lock cams and the pressure cam and to allow a rotation of the lock cams and the pressure cam relative to the gear plate 7. The connection shaft is connected to a motor, etc., and functions to transmit the torque to the drive wheel 23.

In the center of the mobile flange 11, a socket portion 33 is provided by protruding toward the power transmission module 13. Here, the drive hub 19 of the drive wheel 23 is inserted into the socket portion 33, so the mobile flange 11 eccentrically moves in response to an eccentric motion of the drive wheel 23 relative to the gear plate 7.

The above-mentioned power transmission module 13 is operated according to an operational theory similar to that of a conventional reclining device. That is, when the connection shaft is driven by the motor, etc., the drive wheel 23 is rotated and the drive protrusion 21 rotates the lock cams 25. Accordingly, the lock cams 25 rotate the pressure cam 27 while overcoming the elastic biasing force of the wedge spring 29, so the drive wheel 23, the lock cams 25, and the pressure cam 27 are eccentrically rotated relative to the gear plate 7. Here, the socket portion 33 of the mobile flange 11 also performs an eccentric motion. In this case, because the number of the internal gear teeth 9 of the mobile flange 11 is greater than the number of the external gear teeth 5 of the gear plate 7 by one, the eccentric motion of the mobile flange 11 causes the mobile flange 11 to be rotated by a distance corresponding to one tooth when the mobile flange 11 performs a one turn in an eccentric motion relative to the gear plate 7.

On the contrary, even when torque is applied from the seatback to the mobile flange 11, the lock cams 25 and the pressure cam 27 are maintained in their respective eccentric positions by the wedge spring 29. Accordingly, the lock cams 25 and the pressure cam 27 are inhibited or prevented from being rotated, so the seatback can be maintained in a stable position.

Of course, the above-mentioned operation is realized within a predetermined range in which the stop protrusion 15 is movable within the stop hole 17. In other words, even when torque intending to further rotate the seatback to an angle exceeding the range is applied to the seatback, further rotation of the seatback is inhibited or prevented because the stop protrusion 15 is stopped by one of the ends of the stop hole 17.

The reclining device of the present disclosure further includes: a cap housing 37 surrounding the outside periphery of the mobile flange 11, and combined with the base plate 3 by a mounting protrusion 35 inserted into the base plate 3, wherein the mobile flange 11 is integrally provided with a plurality of mobile locking protrusions 39 so as to transmit torque to the seatback via a central opening of the cap housing 37.

In other words, the mobile flange 11, the gear plate 7, and the power transmission module 13 can be maintained in stably assembled positions thereof on the base plate 3 by the cap housing 37. Here, the mobile locking protrusions 39 connected to the back frame of the seatback are rotated together with the back frame.

While the present disclosure has been described with reference to the preferred embodiment, those skilled in the art will appreciate that various modifications, additions and substitutions are possible, without departing from the scope and spirit of the present disclosure as disclosed in the accompanying claims.

What is claimed is:

1. A reclining device for a vehicle seat having a seat cushion and a seatback, comprising:
    a base plate mounted to the seat cushion and integrally provided with an assembling depression;
    a gear plate inserted into and mounted to the assembling depression, and provided with external gear teeth;
    a mobile flange connected to the seatback in such a way that the mobile flange transmits a torque to the seatback, the mobile flange being provided with internal gear teeth, a number of which is greater than a number of the external gear teeth of the gear plate by one, and being eccentrically meshed with the external gear teeth of the gear plate;
    a power transmission module installed in a central portion of the gear plate and eccentrically rotating the mobile flange relative to the gear plate using the torque transmitted from outside; and
    a stop means provided between the mobile flange and the base plate, wherein the stop means includes a stop protrusion formed in the mobile flange and protruding toward the base plate, and an arcuate-shape stop hole formed in the base plate, and
    wherein the stop protrusion is inserted into the arcuate-shape stop hole and is configured to move along the arcuate-shape stop hole defining a predetermined range in which an angle of the seatback relative to the seat cushion is adjusted.

2. The reclining device according to claim 1, wherein the power transmission module comprises:
    a drive wheel provided with a drive hub that passes through a center of the mobile flange and is combined with a connection shaft transmitting the torque, with a drive protrusion provided on the drive wheel in such a way that the drive protrusion is integrally connected to the drive hub;
    lock cams placed outside the drive hub and rotated by the drive protrusion;
    a pressure cam supporting the lock cams at a position outside the lock cams so as to maintain eccentric positions of the lock cams and the drive wheel relative to the gear plate; and
    a wedge spring placed to elastically support the lock cams.

3. The reclining device according to claim 2, further comprising:
    a bushing fitted over the lock cams and the pressure cam so as to support the lock cams and the pressure cam and to allow a rotation of the lock cams and the pressure cam relative to the gear plate.

4. The reclining device according to claim 2, further comprising:
    a cap housing surrounding an outside periphery of the mobile flange, and combined with the base plate by a mounting protrusion inserted into the base plate,
    wherein the mobile flange is integrally provided with a plurality of mobile locking protrusions so as to transmit the torque to the seatback via a central opening of the cap housing.

5. The reclining device according to claim 2, wherein in a center of the mobile flange, a socket portion is provided that protrudes toward the power transmission module, and wherein the drive hub of the drive wheel is inserted into the socket portion so that the mobile flange eccentrically moves in response to an eccentric motion of the drive wheel relative to the gear plate.

* * * * *